United States Patent
Song

(10) Patent No.: US 10,963,013 B2
(45) Date of Patent: Mar. 30, 2021

(54) DISPLAY DEVICE

(71) Applicant: Wuhan China Star Optoelectronics Semiconductor Display Technology Co., Ltd., Wuhan (CN)

(72) Inventor: Yuelong Song, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 291 days.

(21) Appl. No.: 16/311,681

(22) PCT Filed: Nov. 15, 2018

(86) PCT No.: PCT/CN2018/115542
§ 371 (c)(1),
(2) Date: Dec. 20, 2018

(87) PCT Pub. No.: WO2020/077715
PCT Pub. Date: Apr. 23, 2020

(65) Prior Publication Data
US 2020/0125143 A1 Apr. 23, 2020

(30) Foreign Application Priority Data
Oct. 17, 2018 (CN) .......................... 201811208223.1

(51) Int. Cl.
G06F 1/00 (2006.01)
G06F 1/16 (2006.01)
G09F 9/30 (2006.01)

(52) U.S. Cl.
CPC ............ *G06F 1/1652* (2013.01); *G09F 9/301* (2013.01)

(58) Field of Classification Search
CPC .............................. G06F 1/1652; G09F 9/301
See application file for complete search history.

(56) References Cited

U.S. PATENT DOCUMENTS

| | | | |
|---|---|---|---|
| 2012/0062447 A1* | 3/2012 | Tseng | G02F 1/133305 345/33 |
| 2014/0217373 A1 | 8/2014 | Youn et al. | |
| 2020/0105657 A1* | 4/2020 | Lee | H01L 23/4985 |
| 2020/0119124 A1* | 4/2020 | Ahn | H01L 51/0097 |

FOREIGN PATENT DOCUMENTS

| | | |
|---|---|---|
| CN | 107331686 | 11/2017 |
| CN | 107564415 | 1/2018 |
| CN | 207264694 | 4/2018 |
| CN | 108598144 | 9/2018 |

* cited by examiner

*Primary Examiner* — Pete T Lee

(57) ABSTRACT

A display device includes a display panel and a flexible substrate. A first pad and a second pad are arranged on the display panel. The flexible substrate includes a first layer, a first insulating layer, and a second layer on a bending area. A first metal line is arranged in the first layer and connected to the first pad. A second metal line is arranged in the second layer and connected to the second pad. A straightened length of the first metal line is greater than that of the second metal line. The design of a double-layer metal line effectively improves the stress intensity of the metal line in the outer bending area. Therefore, the inner and outer double-line metal line in the bending area is balanced by force, so that the stability of the inner and outer double-line metal line is relatively uniform.

9 Claims, 2 Drawing Sheets

DISPLAY DEVICE

RELATED APPLICATIONS

This application is a National Phase of PCT Patent Application No. PCT/CN2018/115542 having International filing date of Nov. 15, 2018, which claims the benefit of priority of Chinese Patent Application No. 201811208223.1 filed on Oct. 17, 2018. The contents of the above applications are all incorporated by reference as if fully set forth herein in their entirety.

FIELD AND BACKGROUND OF THE INVENTION

The present disclosure relates to the field of flat display technology, and more particularly, to a display device.

It is known that a liquid crystal display (LCD) or an organic light-emitting diode (OLED) display has been widely adopted and widely accepted by the market due to its advantages of compactness and good display effect.

As a cellphone with a high-screen ratio and high resolution becomes more and more popular, the display of the cellphone with a narrow border has become a trend for the development of a cellphone. In this regard, the pad bending technology is widely adopted in the industry for the design of such a narrow border.

Please refer to FIG. 4 illustrating a schematic diagram of the structure of a pad bending that is widely adopted in a display device. A metal line 102 is arranged on a flexible substrate 100 and configured to be electrically connected to a display panel 110 and a printed circuit board (PCB) 120. In general, a metal line is designed as a single-layer metal line or a double-layer metal line in the industry. As for the double-layer metal line, the shape of each of the layers is the same.

As illustrated by the bending area in the circle in FIG. 4, since a certain degree of bending exists in the bending area, the bending of the metal line in the outer layer is greater than the bending of the metal line in the inner layer. Since the upper and lower double-layer metal line is designed with the same shape and length, the bending strength of the metal line in the outer layer is greater than the bending strength of the metal line in the inner layer. Further, the force that the metal line in the outer layer bears is greater than the force that the metal line in the inner layer bears.

This differential force will cause the metal line in the outer layer of the double-layer metal line to be inferior to the metal line in the inner layer in stability because the force that the metal line in the outer layer bears is greater than the force that the metal line in the inner layer bears. Further, the difference in the stability of the metal lines may affect the stability of the subsequent display products to some extent. The metal line in the outer layer may be partially broken due to excessive bending while the metal line in the inner layer is stably connected though.

Therefore, it is necessary to develop a new type of display device to overcome the drawbacks of the related art.

SUMMARY OF THE INVENTION

The present disclosure provides a display device. A flexible substrate in the display device adopts a novel design, that is, the design of a double-layer metal line, which effectively improves the stress intensity of the metal line in the outer bending area. Therefore, the inner and outer double-line metal line in the bending area is balanced by force, so that the stability of the inner and outer double-line metal line is relatively uniform.

According to the present disclosure, a display device includes a display panel and a flexible substrate. A first pad and a second pad are arranged on the display panel. A bending area is defined on the flexible substrate. The flexible substrate includes a first layer, a first insulating layer, and a second layer on a bending area. When the bending area is bent, the first layer serves as an outer layer and the second layer serves as an inner layer of the first layer. A first metal line with a first shape is arranged in the first layer and electrically connected to the first pad; a second metal line with a second shape is arranged in the second layer and electrically connected to the second pad; a straightened length of the first metal line is greater than a straightened length of the second metal line.

Furthermore, the first shape of the first metal line is selected from a curve line, a bending line, and a waveform line, or at least two in combination selected therefrom.

Furthermore, the second shape of the second metal line is selected from a curve line, a bending line, and a waveform line, or at least two in combination selected therefrom.

Furthermore, the first shape is different from the second shape.

Furthermore, the first shape of the first metal line and the second shape of the second metal line are shaped as a bending while a bending angle of the first shape is less than the a bending angle of the second shape so that the straightened length of the first metal line is greater than the straightened length of the second metal line.

Furthermore, the first shape of the first metal line and the second shape of the second metal line are shaped as a curve while a bending curvature of the first shape is greater than the a bending curvature of the second shape so that the straightened length of the first metal line is greater than the straightened length of the second metal line.

Furthermore, the first shape of the first metal line and the second shape of the second metal line are shaped as a waveform while a peak of the first shape is greater than a peak of the second shape so that the straightened length of the first metal line is greater than the straightened length of the second metal line.

Furthermore, the bending area of the flexible substrate further comprises a second insulating layer arranged under the second layer and a third layer arranged under the second layer; a third metal line with a third shape is arranged in the third layer; a length of the third metal line is less than a length of the second metal line.

Furthermore, the third shape of the third metal line is selected from a curve line, a bending line, and a waveform line, or at least two in combination selected therefrom.

Furthermore, the first pad and the second pad arranged on the display panel are arranged in the same layer.

Compared with the related art, the display device of the present disclosure adopts different lengths of design for the metal lines of different layers in the bending area of the flexible substrate. The bending area is bent at the outer layer of the first metal line because the design of prolonging the length effectively compensates for the prolonged length required for the first metal line at the outer side. In this way, it is ensured that both of the first metal line and the second metal line maintain stretched substantially and uniform when the first metal line and the second metal line are bent, thereby making the stability of the first metal line and the second metal line uniform. So it will not happen that the first metal line is over stretched due to the length of the first metal line the same as the length of the second metal line.

Figure 1:
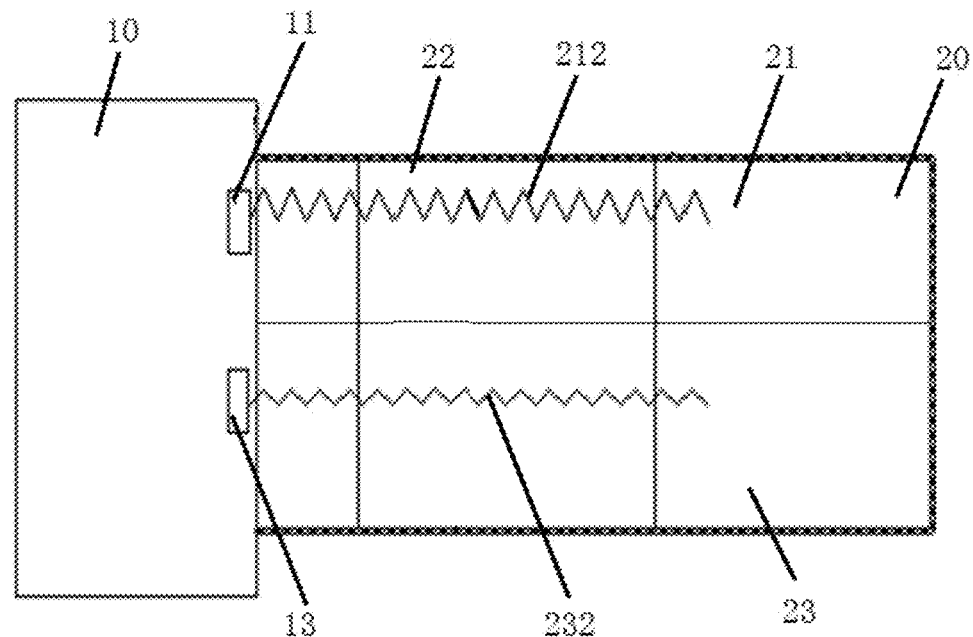
FIG. 1 illustrates a schematic diagram of a display device according to a first embodiment of the present disclosure. To elaborate the flexible substrate, a first insulating layer over the second layer and the first layer over the second layer are not illustrated in FIG. 1.

Elements shown in FIGS. 1-3 and their labeled numbers are depicted as follows: Display panel 10, First pad 11, Second pad 13, Flexible substrate 20, First layer 21, Second layer 23, First metal line 212, Second metal line 232, Bending area 22.

Figure 4:
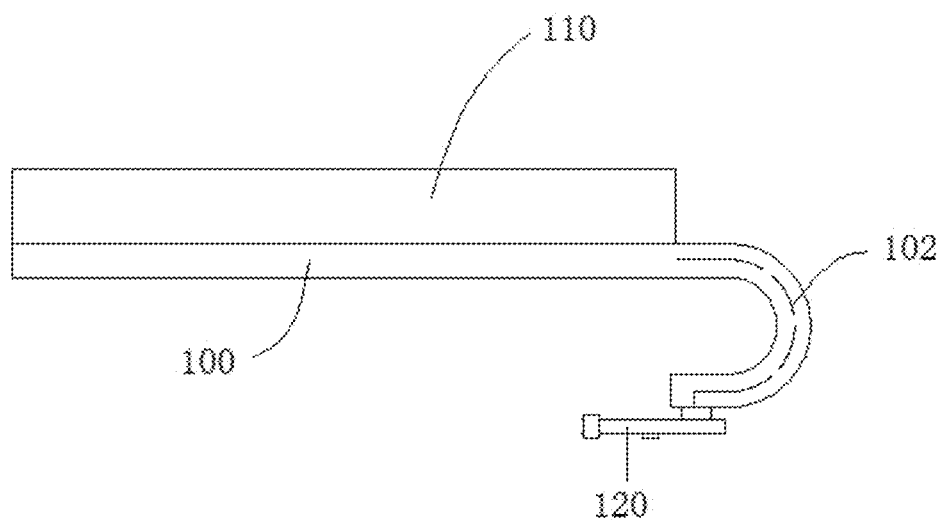
FIG. 4 illustrating a schematic diagram of the structure of a pad bending that is widely adopted in a display device.

Elements shown in FIG. 4 and their labeled numbers are depicted as follows:

Flexible substrate 100, Metal line 102, Display panel 110, PCB 120.

DETAILED DESCRIPTION OF THE SPECIFIC EMBODIMENTS OF THE INVENTION

For better understanding embodiments of the present invention, the following detailed description taken in conjunction with the accompanying drawings is provided.

Please refer to FIG. 1 illustrating a schematic diagram of a display device according to a first embodiment of the present disclosure. The display device includes a display panel 10 and a flexible substrate 20. The flexible substrate 20 includes a metal line arranged in a first layer and a metal line arranged in a second layer. To elaborate the flexible substrate 20, a first insulating layer over the second layer and the first layer over the second layer are not illustrated in FIG. 1.

A first pad 11 and a second pad 13 are arranged on the display panel. The first pad 11 and the second pad 13 may be, but are not limited to, arranged in the same layer. The flexible substrate 20 includes a first layer 21, a first insulating layer (not illustrated), and a second layer 23. The first layer 21 is arranged on the flexible substrate 20. A first metal line 212 with a first shape is arranged in the first layer 21 and electrically connected to the first pad 11 and a printed circuit board (PCB) (not illustrated). A second metal line 232 with a second shape is arranged in the second layer 23 and electrically connected to the second pad 13 and the PCB (not illustrated). The first insulating layer is configured to separate the first layer 21 from the second layer 23.

A bending area 22 is defined on the flexible substrate 20 (the identified area in the figure is merely an exemplary illustration, and the actual range is not limited to this area). When the bending area 22 is bent, the first layer 21 is at the outer layer, and the second layer 23 is at the inner layer of the first layer 21.

The first shape of the first metal line 212 is shaped as a bending, and the second shape of the second metal line 232 is also shaped as a bending in this embodiment. However, the bending angle of the first shape is less than the bending angle of the second shape, thereby ensuring that the straightened length of the first metal line 212 in the bending area 22 is greater than the straightened length of the second metal line 232. So when the first metal line 212 is bent in the bending area, the first metal line 212 on the outer side is over stretched relative to the second metal line 232 at the inner side. However, since the length of the first metal line 212 is greater than the second metal line 232, the prolonged length can effectively compensate for the prolonged length required for the first metal line 212 at the outer side. In this way, it is ensured that both the first metal line 212 and the second metal line 232 maintain stretched substantially and uniform when the first metal line 212 and the second metal line 232 are bent, thereby making the stability of the first metal line 212 and the second metal line 232 uniform. So it will not happen that the first metal line 212 is over stretched due to the length of the first metal line 212 the same as length of the second metal line 232.

Figure 2:
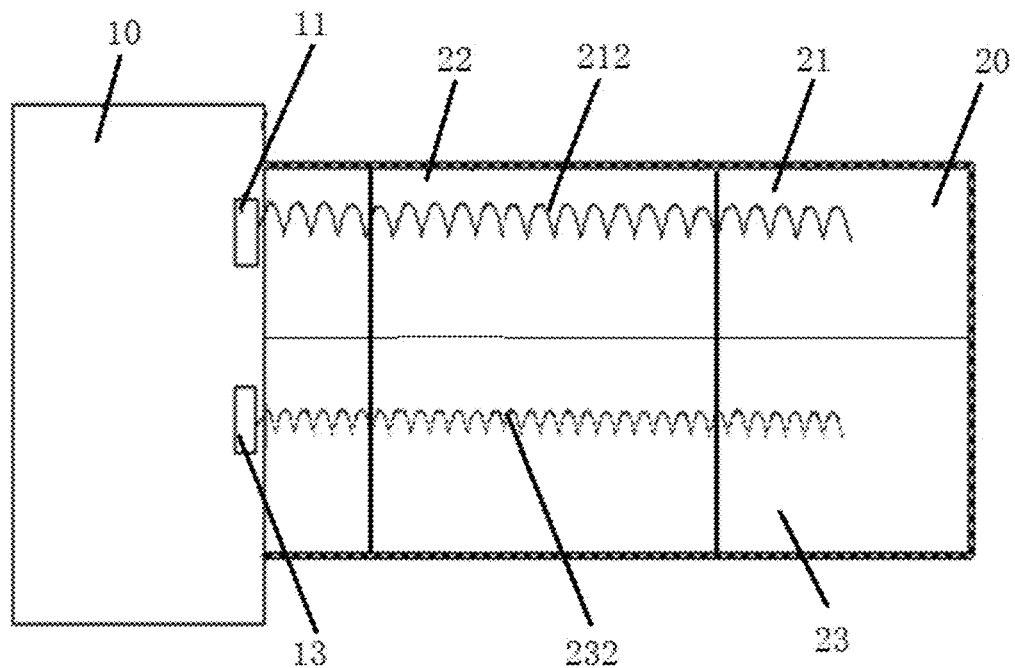
FIG. 2 illustrates a schematic diagram of a display device according to a second embodiment of the present disclosure. To elaborate the flexible substrate, a first insulating layer over the second layer and the first layer over the second layer are not illustrated in FIG. 2.

Please refer to FIG. 2 illustrating a schematic diagram of a display device according to a second embodiment of the present disclosure. The display device includes a display panel 10 and a flexible substrate 20. To elaborate the flexible substrate 20, a first insulating layer over the second layer and the first layer over the second layer are not illustrated in FIG. 2.

A first shape of a first metal line 212 is shaped as a curve. A second shape of a second metal line 232 is also shaped as a curve. However, the bending curvature of the first shape is greater than the bending curvature of the second shape, thereby ensuring that the length of the first metal line 212 in a bending area 22 is greater than the length of the second metal line 232.

Figure 3:
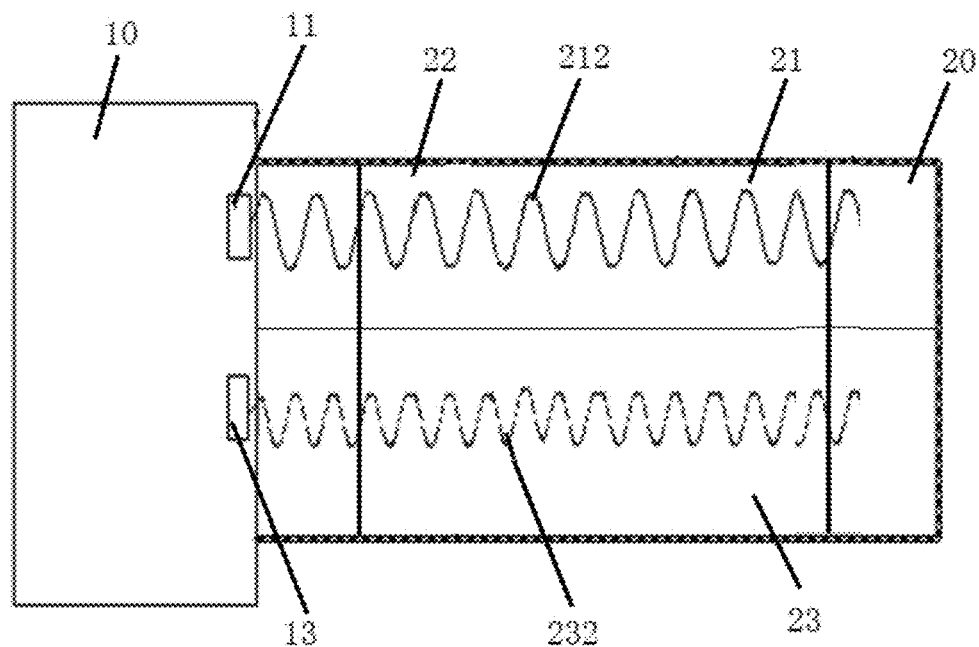
FIG. 3 illustrates a schematic diagram of a display device according to a third embodiment of the present disclosure. To elaborate the flexible substrate, a first insulating layer over the second layer and the first layer over the second layer are not illustrated in FIG. 3.

Please refer to FIG. 3 illustrating a schematic diagram of a display device according to a third embodiment of the present disclosure. The display device includes a display panel 10 and a flexible substrate 20. To elaborate the flexible substrate 20, a first insulating layer over the second layer and the first layer over the second layer are not illustrated in FIG. 3.

A first shape of a first metal line 212 is shaped as a waveform. A second shape of a second metal line 232 is also shaped as a waveform. However, the peak of the first shape is greater than the peak of the second shape, thereby ensuring that the length of the first metal line 212 in a bending area 22 is greater than the length of the second metal line 232.

In the above embodiment, each of the first metal line 212 and the second metal line 232 has the same shape, but differ in parameters of specific shapes, thereby ensuring the length of the first metal line 212 in the bending area 22 is greater than the length of the second metal line 232.

In another embodiment, a first shape which a first metal line 212 forms may be different from a second shape which a second metal line 232 forms as long as the length of the first metal line 212 in a bending area 22 is greater than the length of the second metal line 232. The shapes of the first metal line 212 and the second metal line 232 are determined according to practical needs. In other words, the limitation of the shapes of the first metal line 212 and the second metal line 232 is not necessary.

The display device of the present disclosure adopts different lengths of design for the metal lines of different layers in the bending area of the flexible substrate. The bending area is bent at the outer layer of the first metal line because the design of prolonging the length effectively compensates for the prolonged length required for the first metal line at the outer side. In this way, it is ensured that both of the first metal line and the second metal line maintain stretched substantially and uniform when the first metal line and the second metal line are bent, thereby making the stability of the first metal line and the second metal line uniform. So it will not happen that the first metal line is over stretched due to the length of the first metal line the same as the length of the second metal line.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A display device, comprising:
   a display panel, comprising a first pad and a second pad; and
   a flexible substrate, comprising a first layer, a first insulating layer, and a second layer on a bending area,
   wherein when the bending area is bent, the first layer serves as an outer layer and the second layer is attached to the first layer,
   wherein a first metal line with a first shape is arranged in the first layer and electrically connected to the first pad; a second metal line with a second shape is arranged in the second layer and electrically connected to the second pad; a straightened length of the first metal line is greater than a straightened length of the second metal line,
   wherein the bending area of the flexible substrate further comprises a second insulating layer arranged under the second layer and a third layer arranged under the second layer; a third metal line with a third shape is arranged in the third layer; a length of the third metal line is less than a length of the second metal line.

2. The display device of claim 1, wherein the first shape of the first metal line is selected from a curve line, a bending line, and a waveform line, or at least two in combination selected therefrom.

3. The display device of claim 1, wherein the second shape of the second metal line is selected from a curve line, a bending line, and a waveform line, or at least two in combination selected therefrom.

4. The display device of claim 1, wherein the first shape is different from the second shape.

5. The display device of claim 1, wherein the first shape of the first metal line and the second shape of the second metal line are shaped as a bending while a bending angle of the first shape is less than the a bending angle of the second shape so that the straightened length of the first metal line is greater than the straightened length of the second metal line.

6. The display device of claim 1, wherein the first shape of the first metal line and the second shape of the second metal line are shaped as a curve while a bending curvature of the first shape is greater than the a bending curvature of the second shape so that the straightened length of the first metal line is greater than the straightened length of the second metal line.

7. The display device of claim 1, wherein the first shape of the first metal line and the second shape of the second metal line are shaped as a waveform while a peak of the first shape is greater than a peak of the second shape so that the straightened length of the first metal line is greater than the straightened length of the second metal line.

8. The display device of claim 1, wherein the third shape of the third metal line is selected from a curve line, a bending line, and a waveform line, or at least two in combination selected therefrom.

9. The display device of claim 1, wherein the first pad and the second pad arranged on the display panel are arranged in the same layer.

\* \* \* \* \*